United States Patent
Breu et al.

(10) Patent No.: US 9,677,781 B2
(45) Date of Patent: Jun. 13, 2017

(54) CONTROL OF COOLING FAN ON CURRENT

(71) Applicant: AGCO INTERNATIONAL GmbH, Hesston, KS (US)

(72) Inventors: Wolfgang Breu, Aitrang (DE); Stefan Hammerle, Bernbeuren (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 14/760,280

(22) PCT Filed: Jan. 9, 2014

(86) PCT No.: PCT/EP2014/050334
§ 371 (c)(1),
(2) Date: Jul. 10, 2015

(87) PCT Pub. No.: WO2014/108479
PCT Pub. Date: Jul. 17, 2014

(65) Prior Publication Data
US 2015/0354847 A1    Dec. 10, 2015

(30) Foreign Application Priority Data
Jan. 10, 2013  (GB) .................................. 1300450.2

(51) Int. Cl.
*F24F 11/00*    (2006.01)
*F24F 5/00*    (2006.01)
(Continued)

(52) U.S. Cl.
CPC ........... *F24F 11/0086* (2013.01); *F01P 5/043* (2013.01); *F01P 11/14* (2013.01);
(Continued)

(58) Field of Classification Search
CPC ........ F24F 11/022; F24F 11/025; F01P 5/043; F01P 5/14; F01P 11/14; F01P 2031/20;
(Continued)

(56) References Cited

U.S. PATENT DOCUMENTS 3,938,586 A  *  2/1976  Barlow .................... F01P 11/12
                                                    165/51
6,750,623 B1 *  6/2004  McCauley ............. F01P 7/044
                                                    318/260

(Continued)

FOREIGN PATENT DOCUMENTS

DE    202004007571 U1    8/2004
DE    102004059701 A1    6/2006
(Continued)

OTHER PUBLICATIONS

EU International Searching Authority, International Search Report for International Patent Application No. PCT/EP2014/050334, mailed Apr. 4, 2014.
(Continued)

*Primary Examiner* — Justin Jonaitis
*Assistant Examiner* — Joel Attey

(57) ABSTRACT

A cooling unit for an agricultural vehicle has a grid for allowing air to enter the unit while limiting debris and a heat exchanger for transferring heat from a coolant to air passing across the heat exchanger. The cooling unit further has a duct with motor driven fan, and a controller to monitor fan current and operate the fan in alternating directions. The controller generates a heat exchanger blockage warning when desirable fan current thresholds are not achieved.

4 Claims, 2 Drawing Sheets

(51) Int. Cl.

| | | |
|---|---|---|
| *F24F 7/007* | (2006.01) | |
| *F01P 5/04* | (2006.01) | |
| *F01P 11/12* | (2006.01) | |
| *F01P 11/14* | (2006.01) | |
| *F24F 11/02* | (2006.01) | |
| *F01P 5/14* | (2006.01) | |
| *B60H 1/00* | (2006.01) | |

(52) U.S. Cl.
CPC ............ *F24F 5/0007* (2013.01); *F24F 7/007* (2013.01); *B60H 1/00007* (2013.01); *B60H 1/00571* (2013.01); *B60H 1/00592* (2013.01); *B60H 1/00828* (2013.01); *F01P 5/14* (2013.01); *F01P 11/12* (2013.01); *F01P 2005/046* (2013.01); *F01P 2031/20* (2013.01); *F24F 11/022* (2013.01); *F24F 11/025* (2013.01); *F25B 2600/11* (2013.01); *F25B 2600/111* (2013.01); *F25B 2600/112* (2013.01); *F25B 2700/172* (2013.01); *F25B 2700/173* (2013.01)

(58) Field of Classification Search
CPC ............ F25B 2600/11; F25B 2600/111; F25B 2600/112; F25B 2700/172; F25B 2700/173; B60H 1/00828; B60H 1/00007; B60H 1/00571; B60H 1/00592

USPC .................................. 165/78, 79, 41, 42, 180
See application file for complete search history.

(56) References Cited

U.S. PATENT DOCUMENTS

| | | | |
|---|---|---|---|
| 6,950,029 B2* | 9/2005 | Enzinna | ................ F04D 27/008 318/613 |
| 2002/0003381 A1 | 1/2002 | Nelson et al. | |
| 2003/0183433 A1 | 10/2003 | MacKelvie | |
| 2005/0254800 A1* | 11/2005 | Nelson | .................... F01P 7/048 388/825 |

FOREIGN PATENT DOCUMENTS

| | | |
|---|---|---|
| EP | 1069290 A2 | 1/2001 |
| EP | 1496214 A1 | 1/2005 |
| EP | 1800920 A1 | 6/2007 |
| WO | 2012/135825 A1 | 10/2012 |

OTHER PUBLICATIONS

Intellectual Property Office, International Search Report for UK Application No. GB1300450.2, dated Jul. 9, 2013.

* cited by examiner

CONTROL OF COOLING FAN ON CURRENT

BACKGROUND OF THE INVENTION

Field of Invention

The present invention relates to cooling systems for commercial agricultural vehicles and in particular, but not exclusively, to a cooling unit for a tractor and method of controlling the same.

Description of Related Art

Commercial agricultural vehicles, such as tractors, frequently operate in off-highway environments in which a substantial volume of debris lies on the ground. For example, during crop harvesting, a large volume of waste product is generated by the harvester. This waste falls to the ground behind the harvester. When tractor wheels subsequently pass over the debris it can be thrown into the air and drawn into the tractor's cooling system. This can cause the cooling system to become blocked which can limit the efficiency of the heat exchanger and potentially damage the engine.

The cooling system typically comprises a heat exchanger for removing heat from the engine coolant, a fan for blowing air across the heat exchanger to increase the rate of heat exchange, and a grid positioned upstream of the fan to prevent larger debris from entering the cooling system.

Blockage can occur upstream of the fan at the grid, or downstream of the fan at the heat exchanger.

It is known to monitor the fan motor's current and to reverse the direction of the fan in the event that the current drawn by the motor increases in response to a blocking of the cooling system. However, reversing the fan is only effective at removing debris from the over-pressure side of the cooling package, that is to say, from the grid.

It is an objective of the present invention to at least mitigate one or more of the above problems.

BRIEF SUMMARY OF THE INVENTION

According to a first aspect of the invention there is provided a cooling unit for an agricultural vehicle, the cooling unit including:
    a grid for allowing air to enter the unit whilst limiting the ingress of debris into the unit,
    a heat exchanger for transferring heat from a coolant carried within the heat exchanger to air passing across the heat exchanger,
    a duct situated between the grid and the heat exchanger,
    a fan situated in the duct, the fan driven by a motor to move air along the duct and across the heat exchanger,
    a controller in communication with the motor to monitor the current drawn by the motor,
    wherein the fan is operable by the controller in a first direction to draw air through the grid and across the heat exchanger and in a second direction for a predetermined period of time upon the current drawn by the motor rising above a first predetermined value, and
    wherein the controller generates a heat exchanger blockage warning in the event that the motor current fails to drop below a second predetermined value upon the subsequent rotation of the fan in the first direction.

Advantageously, the monitoring of the fan motor current once the fan has been returned to the first direction of rotation following a period of time of reversal of the direction of the fan in an attempt to clear the blockage allows the controller to determine whether the blockage has been cleared. In the event that the blockage has been cleared (in all likelihood a grid blockage), no further action is taken, but in the event that the blockage has not been cleared (likely to be a heat exchanger blockage) a warning message is generated. This allows the vehicle user to manually clear the blockage.

Preferably, the second predetermined value is less than or equal to the first predetermined value.

According to a second aspect of the invention there is provided a method of detecting and/or removing debris from the cooling unit of an agricultural vehicle, the cooling unit including:
    a grid for allowing air to enter the unit whilst limiting the ingress of debris into the unit,
    a heat exchanger for transferring heat from a coolant carried within the heat exchanger to air passing over the heat exchanger,
    an air duct between the grid and the heat exchanger,
    a fan situated in the air duct, the fan driven by a motor to move air along the air duct,
    a controller in communication with the motor,
    the method including the steps of:
    operating the fan in a first direction to draw air through the grid and across the heat exchanger,
    monitoring the current drawn by the motor,
    operating the fan in a second direction for a predetermined period of time when the current drawn by the motor rises above a first predetermined value,
    operating the fan once more in the first direction,
    generating a heat exchanger blockage warning if the motor current does not drop below a second predetermined value.

Preferably, the second predetermined value is less than or equal to the first predetermined value.

BRIEF DESCRIPTION OF THE SEVERAL VIEWS OF THE DRAWINGS

The invention will now be described, by way of example only, and with reference to the following drawings, in which.

DETAILED DESCRIPTION OF THE INVENTION

Figure 1:
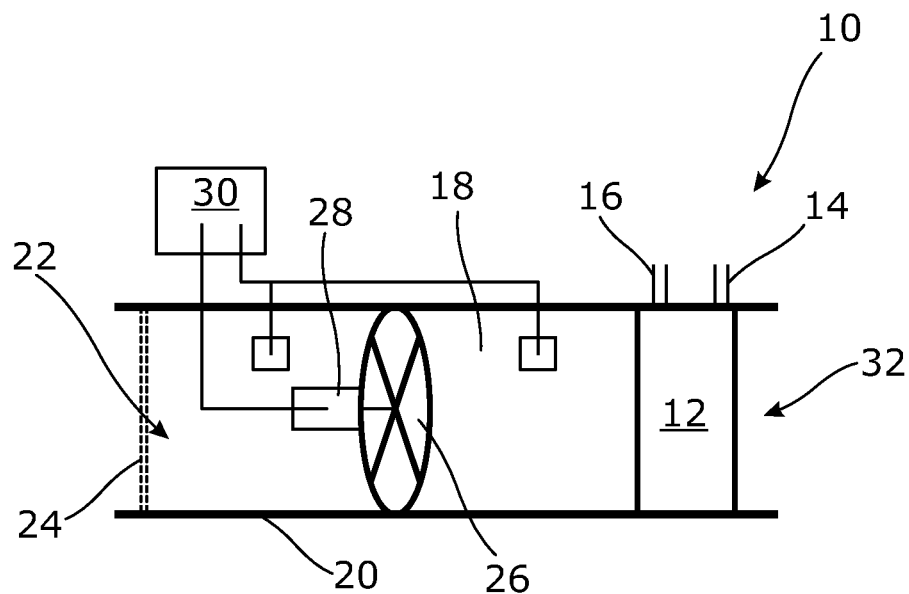
FIG. 1 is a schematic representation of the cooling unit according to the present invention, shown in an unblocked state.

FIG. 1 shows a cooling unit indicated generally at 10. The unit is typically situated under the hood of an agricultural vehicle (not shown for clarity). The purpose of the unit 10 is to receive heated coolant fluid from the vehicle engine or oil cooler and transfer heat from the coolant fluid to the ambient air.

Accordingly, the unit 10 is provided with a heat exchanger 12 which has a coolant fluid inlet 14 and outlet 16 (shown only in FIG. 1 for clarity). The heat exchanger 12 is located within a duct 18 defined by an outer wall indicated generally at 20. The entrance 22 to the duct 18 is protected by a grid 24 which prevents larger debris from being drawn into the duct 18. Positioned within the duct 18 is a fan 26 driven by a motor 28 (shown in FIG. 1 only) which is operated by a controller 30 (also shown in FIG. 1 only), as will be described in further detail shortly.

In use the controller 30 operates the motor 28 to drive the fan 26 in a first direction to draw air through the grid 24 and into the duct 18 via the duct entrance 22. This entrained air is blown across the heat exchanger 12 allowing a transfer of heat from the coolant fluid to the entrained air. Thus, heated air leaves the unit 10 via a duct exit 32 and cooled coolant fluid exits the unit 10 via the heat exchanger outlet 16.

As described above it is not uncommon for debris to cause the unit 10 to become blocked, particularly when the vehicle is used in off-highway locations. There are two principal locations within the unit 10 which can become blocked. The first of these is described with reference to FIG. 2.

Figure 2:
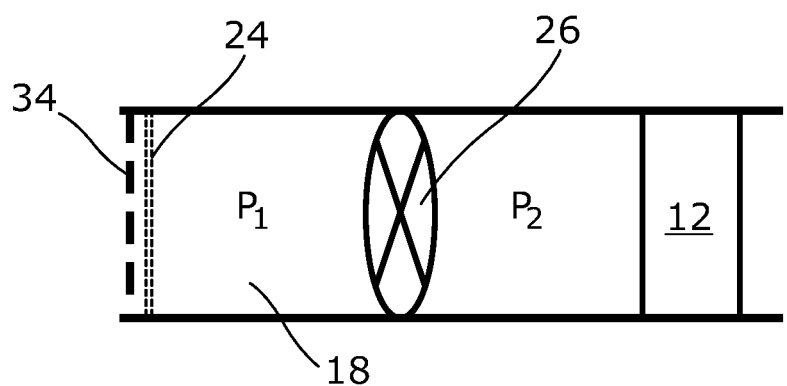
FIG. 2 is a schematic representation of the cooling unit of FIG. 1, shown in a first blocked state.

In FIG. 2 the grid 24 has become at least partially blocked by larger debris indicated generally at 34. This is problematic as the flow rate of the air through the grid 34 and thereby across the heat exchanger 12 is reduced which in turn limits the efficiency of the heat exchanger. This can lead to the engine overheating, potentially causing internal damage to the engine.

As a result of the grid blockage, the pressure $P_1$ in the duct 18 between the grid 24 and the fan 26 decreases as does the pressure $P_2$ in the duct 18 between the fan 26 and the heat exchanger 12. This causes an increase in the load on the fan motor 28. Since the supply voltage to the motor 28 is constant, the current drawn by the motor 28 increases.

Figure 3:
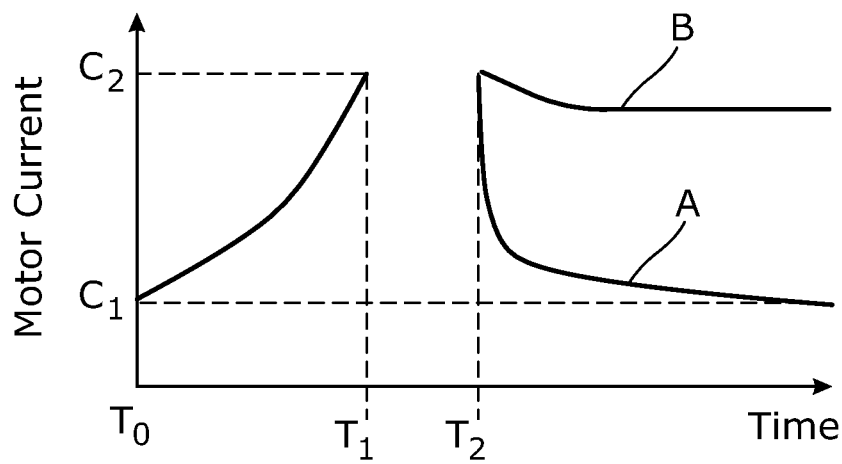
FIG. 3 is a plot of the motor current of the cooling unit of FIG. 1 against time.

Referring now to FIG. 3, a plot of motor current against time is shown. At time $T_0$ a blockage in the grid 24 occurs. As a result the motor current increases from the normal operation level $C_1$ to an elevated predetermined level $C_2$. As soon as the controller 30 detects that the motor current has reached the predetermined level $C_2$, the controller 30 reverses the direction of the motor 28. This causes the fan 26 to blow in a reversed, second direction causing the direction of flow of the air within the duct 18 to reverse for a predetermined period of time ($T_2$-$T_1$). This blows the debris 34 from the grid 24. At $T_2$, the controller 30 once again switches the direction of the motor 28 to drive the fan in its original, first direction. The motor current then drops from $C_2$ to its normal operation level $C_1$ along plot line A as the unit resumes normal operation.

Figure 4:
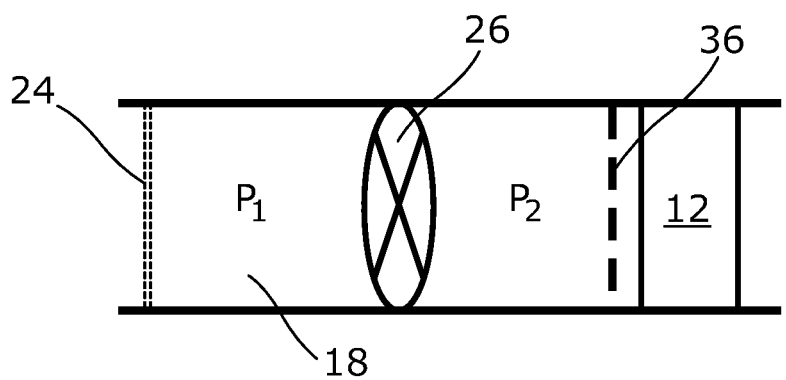
FIG. 4 is schematic representation of the cooling unit of FIG. 1 shown in a second blocked state.

The second mode of blocking is shown in FIG. 4. The heat exchanger 12 (rather than the grid 24 as in FIG. 2) has become at least partially blocked by debris indicated generally at 36. This is problematic for the same reasons as set out above in respect of the grid blockage.

As a result of the heat exchanger blockage, there is an increase in the pressure $P_2$ in the duct 18 between the fan 26 and the heat exchanger 12. This causes an increase in the load on the motor 28 and a corresponding increase in the current drawn by the motor 28.

Referring again to FIG. 3, at time $T_0$ a blockage in the heat exchanger occurs. As a result the motor current increases from the normal operation level $C_1$ to a predetermined level $C_2$, just as it did in the event of a grid blockage as described above. As soon as the controller 30 detects that the motor current has reached the predetermined level $C_2$, the controller 30 reverses the direction of the motor 28. This changes the direction of the fan 26 to its reversed second direction causing the direction of flow of the air within the duct 18 to reverse. However, this is unlikely to dislodge the debris 36 from the heat exchanger 12 as the flow rate during reversal is unlikely to be sufficient to entrain the debris 36.

Referring again to FIG. 3, at $T_1$ the predetermined motor current $C_2$ is reached and the motor changes direction for a predetermined period of time ($T_2$-$T_1$). At T2, the controller 30 switches the motor 28 to drive the fan in its original first direction. However, since the debris 34 has not been successfully cleared from the heat exchanger 12, the motor current will remain at or near $C_2$ along plot line B.

In the event that the controller 30 detects that the motor current does not fall significantly below the predetermined level $C_2$, the controller generates a warning to the vehicle driver that the heat exchanger 12 is blocked.

It will be appreciated that it is conceivable that both the grid 24 and heat exchanger 12 could become blocked. In such an eventuality, the controller would still detect that the motor current had not dropped after fan reversal and generate a warning that the heat exchanger 12 is blocked.

The cooling unit of the present invention therefore achieves significant advantages over the prior art in that it warns the driver of a blockage in the event that the blockage is not cleared by the reversal of the fan, and furthermore indicates to the driver the location of the blockage.

The invention claimed is:

1. An engine cooling unit for an agricultural vehicle, the engine cooling unit including:
   a grid for allowing air to enter the unit whilst limiting the ingress of debris into the unit,
   a heat exchanger for transferring heat from a coolant carried within the heat exchanger to air passing across the heat exchanger,
   a duct situated between the grid and the heat exchanger,
   a fan situated in the duct, the fan driven by a motor to move air along the duct and across the heat exchanger,
   a controller in communication with the motor to monitor the total current drawn by the motor,
   wherein the fan is operable by the controller in a first direction to draw air through the grid and across the heat exchanger and in a second direction for a period of time upon the total current drawn by the motor rising above an elevated value, the elevated value being a value of total current drawn by the motor which is indicative of a blockage in the grid, and
   wherein the controller generates a heat exchanger blockage warning in the event that the total motor current fails to drop below the elevated value upon the subsequent rotation of the fan in the first direction.

2. The engine cooling unit of claim 1, wherein the heat exchanger blockage warning indicates the location of the blockage.

3. A method of detecting and/or removing debris from an engine cooling unit of an agricultural vehicle, the engine cooling unit including:
   a grid for allowing air to enter the unit whilst limiting the ingress of debris into the unit,
   a heat exchanger for transferring heat from a coolant carried within the heat exchanger to air passing over the heat exchanger,
   an air duct between the grid and the heat exchanger,
   a fan situated in the air duct, the fan driven by a motor to move air along the air duct,
   a controller in communication with the motor,
   the method including the steps of:
   operating the fan in a first direction to draw air through the grid and across the heat exchanger,
   monitoring the total current drawn by the motor,
   operating the fan in a second direction for a period of time when the total current drawn by the motor rises above an elevated value, the elevated being a value of the total current drawn by the motor which is indicative of a blockage in the grid,
   operating the fan once more in the first direction, generating a heat exchanger blockage warning if the total motor current does not drop below the elevated value.

4. The engine cooling unit of claim 2, wherein the heat exchanger blockage warning indicates a heat exchanger blockage.

\* \* \* \* \*